Oct. 23, 1962 W. H. WOOD 3,059,597
DRY SANITARY CLOSET
Filed Feb. 4, 1959
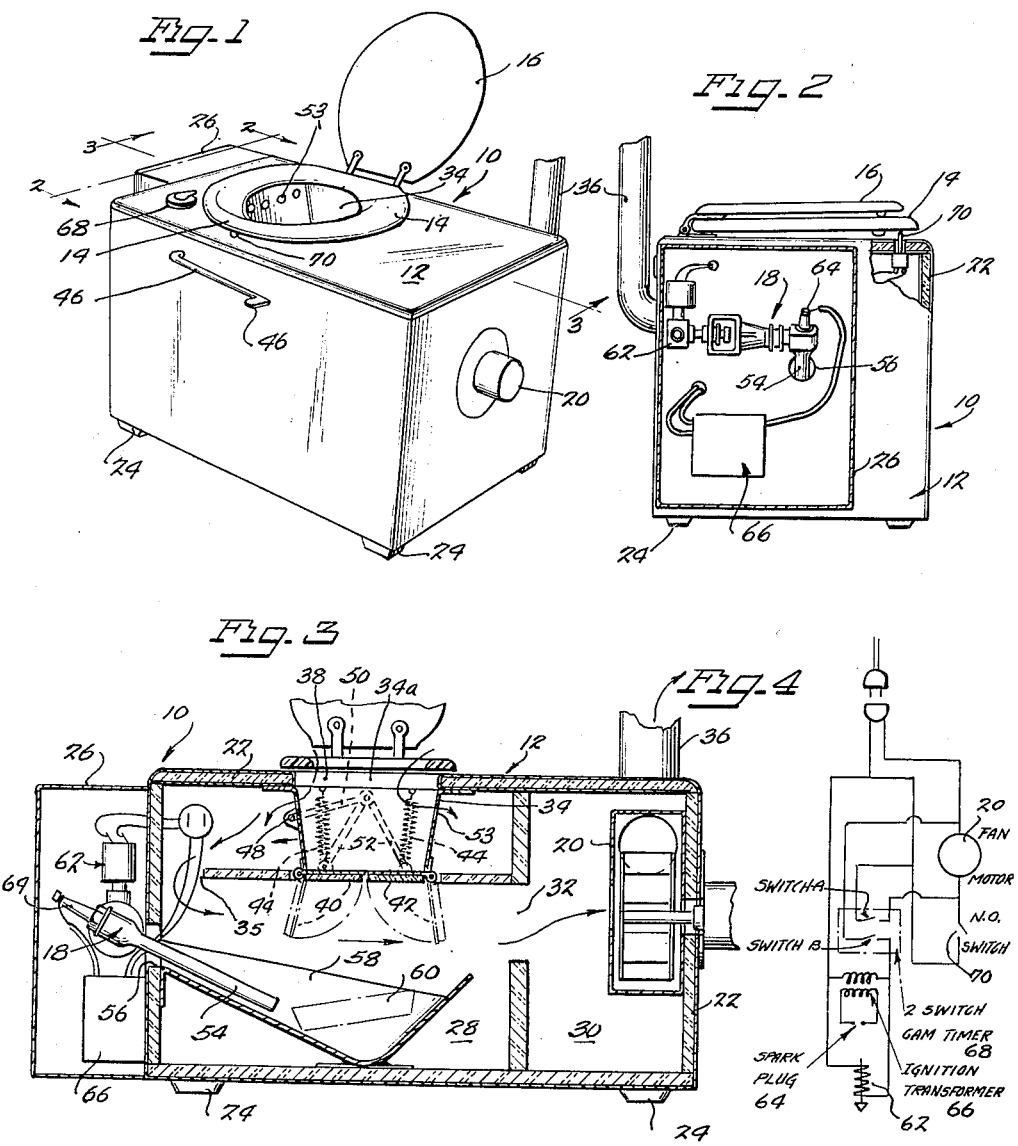
Inventor
WILLIAM H. WOOD
By 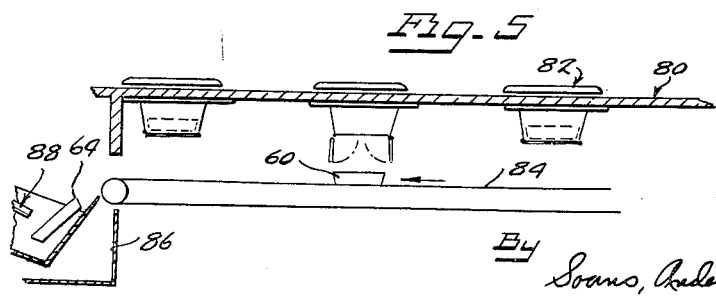
Att'ys

United States Patent Office 3,059,597
Patented Oct. 23, 1962

3,059,597
DRY SANITARY CLOSET
William H. Wood, Chicago, Ill., assignor to Ken-Lab, Inc., Walworth, Wis., a corporation of Delaware
Filed Feb. 4, 1959, Ser. No. 791,189
2 Claims. (Cl. 110—9)

This invention relates to a dry sanitary closet and is most particularly directed to a sanitary closet having a crematory means in it for consuming the waste products.

The disposal of sewage waste materials is an ever increasing problem. In many locations the sewage handling facilities are greatly overburdened and, as a result, dangerous sanitary conditions exist or are imminent. The sewerage systems and the sewage treatment facilities generally have not been able to keep pace with the population growth in many areas. Consequently, there has been considerable demand for a more satisfactory means for handling waste materials other than the conventional water-borne form of sanitation means which requires extensive and costly sewerage systems as well as expensive sewage treatment plants.

Then too, there are many instances in which the handling of waste materials is an individual task, since no sewerage systems are available. For example, the lack of a sewerage system in many newly developed suburban areas has necessitated the use of individual septic tanks or the like which involve relatively large tile fields for drainage. These individual liquid borne sewage handling and treating means require larger lots for the individual homes and in general are not too satisfactory in their operation.

In still other cases, such as on moving vehicles, buses, airplanes and the like, there is no opportunity for the use of either of the above described water-borne forms of sewage handling and other measures must be taken. Generally, such situations are handled on a temporary basis by the use of chemicals which retard septicity until such time when the waste can be transferred to a sewage disposal facility.

Considerable difficulties are encountered with the known forms of apparatus for handling waste material, particularly with respect to the septicity and accompanying noxious odors which occur not infrequently with many of the known apparatus, and with respect to the time and expense involved in reducing the waste material to a substance which is sufficiently deactivated and non-toxic for final disposition in a flowing stream or the like.

The primary object of the present invention is to provide a dry sanitary closet which is particularly adapted for individual or home use, and which affords cremation of the waste material to an extent such that the material passes into the atmosphere in the form of indiscernible and completely burned ash particles. Another object is to provide a dry sanitary closet of the crematory type which is completely efficient in consuming the waste material, which is economical to construct and safe in its operation. Further objects and advantages will be apparent from the following description of the illustrated embodiment of the invention.

In the drawings:
FIG. 1 is a perspective view of the dry closet.
FIG. 2 is a sectional view taken along the line 2—2 in FIG. 1.
FIG. 3 is an enlarged cross-sectional view taken along the line 3—3 in FIG. 1.
FIG. 4 is a diagram of the electrical control circuit for the dry closet.
FIG. 5 illustrates a modified form of the invention, wherein a plurality of toilet bowls is served by a single crematory basin.

With reference particularly to FIGS. 1–3 of the drawings, it will be seen that the illustrated dry closet 10 comprises a generally rectangular housing 12 mounting an ordinary toilet seat 14 having a hinged cover 16, and including a cremating device 18 and a blower fan 20. The housing 12 may be of any suitable material, but it has been found to be particularly satisfactory to form the housing of metal, such as stainless steel or aluminum, or of a strong thermosetting plastic, with the internal walls of the housing being faced with a suitable insulating material 22, such as asbestos. The walls of the housing are preferably welded together, or integrally formed if plastic is used, to thereby insure the formation of a complete airtight seal along the juncture of the walls. The housing is preferably elevated slightly with respect to the floor, by means of a leg 24 fixed to each corner of the housing. At one end of the housing 12 there is disposed a removable metal cabinet 26 for enclosing the cremating apparatus.

The housing 12 is divided internally to provide a lower compartment 28 (FIG. 3) within which the cremation is carried on, and also to provide a side compartment 30 housing the exhaust fan 20 which is to carry away the fumes and the hot gases which include indiscernible ash particles resulting from the cremation. Each of these compartments is preferably formed by walls including insulating material, leaving suitable openings 32, 34a and 35 therein to afford the necessary passage of the waste material into the crematory compartment, as well as to direct air through the housing in a manner affording passage of air between a toilet bowl 34 and an exhaust pipe 36 provided at the rear of the closet housing.

The top of the housing 12 is provided with a suitable circular opening 38 therethrough which communicates with the toilet bowl 34. The bowl 34 is preferably formed of metal, such as stainless steel, and is generally frusto-conical in shape with the smaller diameter opening of the bowl disposed at the bottom. The lower end portion of the bowl includes a pair of hinged trap doors 40 and 42 which are held in a closed, generally horizontal position by a pair of springs 44, and these doors are adapted to be swung downwardly, to the position indicated in dotted lines in FIG. 3, by means of an operating linkage connected to a control lever 46 on the front of the dry closet, as seen in FIG. 1. The lever 46 is in the form of a crank, having one arm portion 48 (FIG. 3) extending into the housing and journaled in suitable brackets fixed to one side of the bowl 34. Also fixed to the crank arm 48 for rotation therewith, is an arm 50 which extends to a pivotal connection with the upper end of each of a pair of links 52 which are pivotally connected, respectively, to the hinged doors 40, 42 forming the bottom of the toilet bowl. Consequently, downward movement of the lever 46 is accompanied by downward opening motion of the hinged doors 40, 42, and when the lever is released the doors are swung to a closed position by the tension coil springs 44. The hinged doors or flaps, as well as the toilet bowl, are faced with suitable insulating material, in order to avoid transmission of heat from the underlying cremating device to the toilet bowl. The side walls of the bowl 34 are provided with a plurality of openings 53 (FIGS. 1 and 3) therethrough, in order to afford circulation of air through the housing in a manner to be described.

The cremating device 18 may be of various known types, but it has been found particularly satisfactory to use a gas jet which is capable of producing very intense heat within a relatively small area. Such a gas jet is indicated by the tubular nozzle 54 (FIG. 3) which extends through an opening 56 in the side wall of the housing 12 and which terminates adjacent the center of the crematory compartment 28.

An angularly formed metal tray or crematory basin 58 having inclined side and bottom forming walls is provided immediately below the toilet bowl 34 for receiving the waste material as the hinged flaps forming the trap doors 40, 42 are swung to their open position, and the gas jet 54 is disposed along one wall of this tray in position to direct a flame of intense heat at the waste material, as indicated in FIG. 3. In this latter respect, it is intended that, prior to use, the toilet bowl 34 is provided with a receptacle 60 made of combustible material, such as wax paper. All of the waste material is caught in the receptacle 60, and the entire receptacle is released into the crematory basin 58 when lever 46 is moved downwardly.

The gas jet crematory 18, which may be fueled with natural gas or propane gas, includes mechanism for providing controlled flow of fuel and controlled firing of the fuel. In the illustrated embodiment, there is provided a solenoid operated fuel valve 62 (FIG. 2) for controlling the flow of fuel through the nozzle 54. Although not shown, it will be understood that the fuel line includes an accepted form of safety device for shutting off the flow of gas when there is a failure of the ignition system and no flame is present. The crematory control system also includes an igniter such as a spark plug 64 which is suitably connected to a source of electrical current, through a transformer 66, and which is operable to ignite the fuel as it flows through the fuel valve. The fuel valve 62 and spark plug 64 are connected with a timer mechanism having a control dial 68 disposed adjacent the toilet seat (FIG. 1) and which is selectively operable to determine the length of operation of the cremating device. The timer mechanism is also connected to the exhaust fan 20, which is preferably of the squirrel-cage type, for operation of the fan to exhaust the fumes and ash particles during operation of the crematory.

The exhaust fan is also connected to a spring biased switch 70, seen particularly in FIG. 2, which extends upwardly in position for engagement with the seat section. The switch 70 is normally open and is engaged by the lowered toilet seat 14. When the seat is in use, the switch 70 is displaced downwardly through the weight of the occupant to thereby close the switch and start the exhaust fan 20 operating. Thus there is a circulation of air and exhaust of the housing prior to the cremation of any waste material. As indicated by the arrows in FIG. 3, the air is drawn through the openings 53 in the side wall of the toilet bowl and passes around the bowl and downwardly through the opening 35 at one end of the housing, through the upper portion of the crematory compartment 28, and thence through opening 32 to the fan and out the vent pipe 36.

It is seen, therefore, that the cool air drawn in by the fan passes around the toilet bowl to maintain a low temperature in this zone. Furthermore, the cool air passing through the crematory compartment 28 remains at the upper strata in this compartment in order not to diminish the heat present in the crematory basin 58 which is spaced a substantial distance below the lower end of the toilet bowl. Hot gases produced during the cremation rise to mix with this cooler air and pass into compartment 30 and out vent pipe 36.

The fan motor is connected with the timer switch in such a way that, if the latter has been set to effect operation of the cremating device, the exhaust fan will continue to operate even after the switch 70 has been released and moved to its open position. This dual control of the exhaust fan may be achieved in any suitable manner, but there is shown in FIG. 4 of the drawings a suitable wiring diagram for accomplishing this purpose. It will be apparent that other forms of electrical control circuits might be used to achieve the desired results. For example, a thermostat may be placed within the housing and connected in controlling relation to switch "A" in order to provide for operation of the exhaust fan until a predetermined cool temperature is reached in the area of the toilet bowl.

The intense and concentrated heat produced by the gas jet readily consumes the waste material and its waxed paper receptacle, leaving only a very fine ash which is virtually imperceptible and which passes out vent pipe 36 as the exhaust fan 20 continues to operate. In some instances it may be desirable to use the hot exhaust gases as a source of heat for the area surrounding the dry closet. This can be readily achieved by using a bare metal vent pipe and directing it around the dry closet before terminating the pipe at a suitable position of exhaust to the atmosphere.

The described cremation and waste removal system may also be used in connection with a plurality of toilet bowls, for example, in the manner illustrated schematically in FIG. 5. A single elongated housing 80 is provided with a series of toilet bowls 82 of the type described above and seen particularly in FIG. 3. Underlying the line of toilet bowls 82 is an endless conveyor 84 which is preferably motor driven and made of flexible stainless steel or the like. As a receptacle containing waste material is deposited on the endless conveyor, it is carried to one end of the housing 80 where it is deposited in a chute leading to a crematory basin 86 similar to that shown in FIG. 3, although perhaps of a larger size than that required for a single bowl dry closet. A cremating device 88, or a plurality of such devices, similar to that described above is located adjacent the crematory basin and may be turned on periodically to burn up the waste material. In the handling of a larger volume of waste material, it has been found beneficial to provide the crematory basin with a cover and a slotted control damper in order to retain the heat within the basin. Although not shown in FIG. 5, it will be understood that an exhaust fan and vent pipe may be provided in the crematory portion of the housing to function in the manner described with respect to the apparatus shown in FIGS. 1–3.

Although shown and described with respect to particular apparatus, it will be apparent that other modifications might be made without departing from the principles of this invention.

I claim:

1. A waste disposal apparatus comprising a housing, a toilet bowl communicating with an opening in the top of said housing and extending downwardly into said housing, means within said housing defining a displaceable bottom for said bowl, a receptacle disposed in said housing in underlying relation to said displaceable bottom and having inclined side and bottom forming walls terminating at their lower ends in closely spaced relation at a position generally centrally disposed with respect to said displaceable bottom, a cremating device in said housing comprising a gas jet burner disposed along one of said inclined walls in position to direct a flame generally parallel to said wall toward a transverse inclined wall and at a position below the upper edges of said walls, and a blower means associated with said housing and operable to provide a flow of air through the housing to the atmosphere through a generally horizontal path located intermediate said displaceable bottom forming means and said receptacle and in the general direction of said jet flame, to thereby provide the gas jet flame with sufficient oxygen to rapidly oxidize waste materials in said receptacle and to exhaust the gases into the atmosphere.

2. A waste disposal apparatus comprising a housing, a toilet bowl communicating with an opening in the top of said housing and extending downwardly into said housing, means within said housing defining a displaceable bottom for said bowl, a receptacle disposed in said housing in underlying, spaced relation to said displaceable bottom and having inclined side and bottom forming walls terminating at their lower ends in closely spaced relation at a position generally centrally disposed with respect to said displaceable bottom, a cremating device in said housing comprising a gas jet burner disposed along one of said inclined walls in position to direct a flame generally parallel to said wall and toward a transverse inclined wall and at a position within said receptacle below the upper edges of said walls, and a blower means associated with said housing and operable to provide a flow of air through the housing to the atmosphere through a generally horizontal path below said displaceable bottom forming means past said receptacle and in the general direction of said jet flame, to thereby provide the gas jet flame with sufficiently abundant oxygen to rapidly oxidize waste materials in said receptacle and exhaust the gases to the atmosphere.

References Cited in the file of this patent

UNITED STATES PATENTS

| | | |
|---|---|---|
| 749,769 | Wilson | Jan. 19, 1904 |
| 2,279,578 | Martin | Apr. 14, 1942 |
| 2,771,533 | Osberg et al. | Nov. 20, 1956 |
| 2,835,215 | Harm | May 20, 1958 |
| 2,903,709 | Blankenship et al. | Sept. 15, 1959 |